United States Patent [19]

Yamazaki et al.

[11] 4,007,232
[45] Feb. 8, 1977

[54] ACRYLIC SYNTHETIC FIBER SUPERIOR IN NON-INFLAMMABILITY

[75] Inventors: Taoru Yamazaki, Akashi; Shiyunichiro Kurioka; Takashi Hatano, both of Kobe; Yukihiro Higashiyama; Sadame Asada, both of Takasago, all of Japan

[73] Assignee: Kanegafuchi Kagaku Kogyo Kabushiki Kaisha, Osaka, Japan

[22] Filed: Dec. 23, 1975

[21] Appl. No.: 643,811

[30] Foreign Application Priority Data

Dec. 23, 1974  Japan ............................... 50-1374
Dec. 23, 1974  Japan ............................... 50-1373
Jan. 9, 1975   Japan ............................... 50-5392
Jan. 29, 1975  Japan ............................... 50-12663

[52] U.S. Cl. .................... 260/836; 260/45.75 A; 260/45.75 B; 526/273; 526/303; 526/328; 526/330; 526/342; 526/345

[51] Int. Cl.$^2$ ......................................... C08K 3/22

[58] Field of Search ........ 260/80.77, 898, 45.75 A, 260/45.75 B, 88.7 R, 836; 264/182

[56] References Cited

UNITED STATES PATENTS

| 2,515,206 | 7/1950 | Finzel et al. ................ 260/80.77 |
| 2,629,711 | 2/1953 | Stanin et al. ................ 260/88.7 R |
| 2,687,405 | 8/1954 | Rothrock et al. ................ 260/836 |
| 2,749,321 | 6/1956 | Ham ................ 260/80.77 |
| 3,092,598 | 6/1963 | Hahn et al. ................ 260/80.77 |
| 3,395,133 | 7/1968 | D'Alelio ................ 260/88.7 R |
| 3,493,536 | 2/1970 | Weisfeld ................ 260/45.75 B |
| 3,562,354 | 2/1971 | Golstein ................ 260/836 |
| 3,764,638 | 10/1973 | Hwa et al. ................ 260/836 |
| 3,907,958 | 9/1975 | Tsujii et al. ................ 260/45.75 |

FOREIGN PATENTS OR APPLICATIONS

| 48-29502 | 4/1973 | Japan |
| 49-7523 | 1/1974 | Japan |

OTHER PUBLICATIONS

The Chemistry and Uses of Fire Retardants—John W. Lyons, Wiley Interscience, NYC, 1970, pp. 304 to 317.

*Primary Examiner*—V. P. Hoke
*Attorney, Agent, or Firm*—Moonray Kojima

[57] ABSTRACT

An acrylic synthetic fiber comprising an acrylic copolymer consisting essentially of acrylonitrile, vinyl chloride and vinyl idene chlorde in the weight percentages defined by the formula $$102.8 < A + B + 1.29C < 107.4,$$

wherein A is the weight percent of a mixture of olefinic monomers excluding vinyl chloride, vinylidene chloride and monomers having dyeable sites in their molecular structures, and may consist of acrylonitrile in an amount of 40 to 65 weight percent, B is the weight percent of vinyl chloride and C is the weight percent of vinylidene chloride. There may be added 0.3 to 10 weight percent antimony oxide and/or stannic oxide, and/or 0.2 weight percent to 20 weight percent of a polymer or copolymer of glycidyl methacrylate.

7 Claims, No Drawings

ACRYLIC SYNTHETIC FIBER SUPERIOR IN NON-INFLAMMABILITY

BACKGROUND OF THE INVENTION

This invention relates to a new synthetic fiber of the acrylic series having a superior non-inflammability and moreover, superior in the properties of light-proof, anti-rusting, anti-yellowing from thermal exposure and anti-devitrifying.

Acrylic fibers have many superior chemical and physical properties such as dyeability, touch, light-proof, etc. However, recently demand has increased for textile products, such as those made of acrylic fibers, having non-inflammability properties. Especially as the desired quality of life has increased, demand for protection from fire has increased. There is increased governmental regulation of product safety, especially from easy inflammability of acrylic fibers. For example, since the conventional acrylic fiber has a defect in its non-inflammability, it cannot be used widely as material for, such as, interior products such as curtains and carpets, and for baby's and children's clothes, and clothing for the aged. These products should be non-inflammable.

In order to improve the inferior non-inflammability of acrylic fibers, various techniques have been used in the prior art. For example, known is a method using spinning dope of acrylic resin containing a known non-inflammabilizing agent. In another method, a non-inflammabilizing agent is added by an after treatment. In still another method, a spinning dope containing an acrylic resin and a non-inflammable polymer is used. However, in none of these prior methods has a satisfactory result been yet achieved. For example, when adding a non-inflammabilizing agent, the characteristic properties of acrylic fiber such as touch, etc, are considerably changed for the worse since it is necessary to add a large quantity of non-inflammabilizing agent to obtain sufficient non-inflammability of the acrylic fiber. Moreover, it is impossible to obtain a permanent non-inflammability since the added agent is gradually lost during the dyeing step and with each washing of the fiber. Further, when spinning the polymer mixture, it is difficult to produce a non-inflammable acrylic fiber industrially since it is difficult to retain the dope in a stable uniform state.

Furthermore, an acrylic fiber having a semi-permanent non-inflammability may be obtained by a method which carries out copolymerization of acrylonitrile with a halogen-containing monomer such as, for example, vinyl chloride, vinylidene chloride, vinyl bromide, vinylidene bromide, etc. However, in this case, although the non-inflammability of the obtained fiber increases with the increase of the content of halogen in the copolymer, other characteristic properties of acrylic fiber such as anti-devitrifying property, light-proof property, anti-rusting property, durability of whiteness in thermal exposure, and thermal durability etc, correspondingly decrease. Therefore, it is concluded that in the prior art, an acrylic fiber having both superior non-inflammability and other characteristic properties such as anti-devitrifying property, light-proof property, anti-rusting property, anti-yellowing property in thermal exposure and thermal durability has not yet been realized.

Japanese Pat. Pub. No. S.48 (1973)—29502 discloses that the anti-vitrifying property of acrylic fiber becomes inferior until the fiber is completely devitrified if the content of halogen-containing monomer in a copolymer of acrylonitrile and vinyl chloride or in a copolymer of acrylonitrile and vinylidene chloride, from which the fiber is produced, is 20 to 70 weight percent. The above Japanese Patent discloses a method for improving such a disadvantageous property of the modified acrylic fiber, namely, a method of spinning a dope of acrylic resin containing a certain amount of polymer of glycidyl methacrylate. The method is believed to be effective in preventing the devitrifying of the modified fiber.

Furthermore, regarding the light-proof property of acrylic fiber, kokai Japanese Pat. Pub. No. S.49 (1974)—7523 discloses the light-proof property of modacrylic synthetic fiber of vinylidene chloride series containing a large amount of halogen atoms in its molecular structure of copolymer as being rather inferior. It is generally believed that the most serious disadvantage of copolymers of acrylonitrile series containing halogen containing monomers is their easy color change when exposed to light or heat since the thermal stability and light-proof properties of such copolymer are poor. Moreover, there is the disadvantage of erosion and rusting of machines used for preparation of synthetic fibers from the copolymer. Moreover, rusting and erosion take place in spinning and weaving machines used for manufacturing spun yarn and clothes from such synthetic fibers.

SUMMARY OF THE INVENTION

It is an object of this invention to obtain an acrylic fiber having the combined properties of non-inflammability, and other such properties as anti-devitrifying, light-proof, anti-rusing, anti-yellowing from thermal exposure, heat-proof. These properties are desired for textile materials.

Briefly, this invention encompasses an acrylic synthetic fiber comprising a copolymer of a polycomponent system consisting essentially of 40 to 65 weight percent acrylonitrile, vinyl chloride and vinylidene chloride in the ranges defined by the formula $$102.8 < A + B + 1.29C < 107.4 \qquad (I)$$

wherein A is the weight percent of a mixture of olefinic monomers excluding vinyl chloride, vinylidene chloride and monomers having dyeable chemical sites in their molecular structures, and which olefinic monomers mainly comprise acrylonitrile, B is the weight percent of vinyl chloride and C is the weight percent of vinylidene chloride. It should be mentioned here that A is to include such olefinic monomers mixtures. Further, in the other features of the invention, there may be added to polymer 0.3 to 10 weight percent of animony oxide and/or stannic acid, based on the weight of the copolymer. In other features of the invention, in addition to or in substitution of the antimony oxide and/or stannic acid, there may be added 0.2 to 20 weight percent of a polymer or copolymer of glycidyl methacrylate based on the weight of the copolymer.

The advantages and surprising results produced by the additives and the novel acrylic copolymer having the components within the ranges set forth hereinabove will be explained hereinafter in greater detail.

DETAILED DESCRIPTION OF PREFERRED EMBODIMENT

It is generally known that from a copolymer of acrylonitrile and vinyl chloride or acrylonitrile and vinylidene chloride, a synthetic fiber having acceptable non-inflammability property can be produced. Although the mechanism which makes the fiber non-inflammable is not clearly understood, it was believed that the hydrogen halide gas generated from the copolymer by thermal decomposition may interrupt the approach of atmospheric oxygen to the fiber since it is heavier than the air. At the same time, the generated unsaturated hydrocarbon structures in the polymer molecule reacts with each other and form a three dimensional net-work structure, that is, the carbonization of acrylic copolymers. Thus, the combustion of the fiber cannot be continued. Accordingly, it has long been considered that the non-inflammability of acrylic copolymer with halogen-containing monomers increased with the increase of halogen content in the copolymer. Therefore, vinylidene chloride was believed to be more effective than vinyl chloride, if it was intended to obtain an acrylic copolymer having the higher degree of non-inflammability at a definite content of acrylonitrile in the copolymer, since vinylidene chloride contains more chlorine per unit weight than does vinyl chloride.

However, from the studies carried out by the present inventors, this does not appear to be the case. In studying the combustion mechanism of non-inflammability, it was discovered that the non-inflammability of acrylic copolymers does not always depend upon the content of chlorine in the copolymer, that is, on the amount of generated non-combustible gas. Rather, it also depends upon the condition where the non-combustible gas is to be generated by thermal exposure and on the condition of carbonization of the polymer itself. Therefore, the most remarkable effect on non-inflammability can be achieved only when those conditions mentioned above are in suitable balance. The present inventors have discovered a composition of acrylic copolymer which has a desirable balance between the two conditions, namely, the condition for generation of non-combustible gas and the condition of carbonization of the polymer. The present inventors have discovered that combining a copolymer of a polycomponent system consisting essentially and mainly of acrylonitrile, vinyl chloride and vinylidene chloride in the weight ratios set for above as formula (I) and a small amount of antimony oxide and/or stannic acid, in one aspect of the invention, a suitable balance between the two conditions could be achieved and accordingly a fiber having very superior non-inflammability could be obtained. It is preferred to combine a copolymer of a polycomponent system consisting essentially of mainly 40 to 65 weight percent acrylonitrile and mainly vinyl chloride and vinylidene chloride having the weight proportions set forth above as formula (I), and 0.3 to 10 weight percent of antimony oxide and/or stannic acid. It is to be understood that a copolymer of a polycomponent system consisting of a olefinic monomer mixture in which acrylonitrile is the main component together with mainly vinyl chloride and vinylidene chloride may be used.

Regarding the formula (I), it has been discovered that if the amount of A + B + 1.29C is not more than 102.8, since the carbonization state of the combustion product is incomplete and soft, and since the effect by the generation of non-combustible gas is insufficient, a burning flame cannot be extinguished automatically and the effect on the non-inflammability is poor. On the other hand, if the amount is not less than 107.4, a complete carbonization state appears rapidly in a combustion, and thus covering the surface of a textile material and the non-inflammability is observed to be poor. The reason for this inferior inflammability is not well understood, but it is believed that the effective amount of non-combustible gas generation may be rather small or much smaller than that expected from the composition of copolymer since the carbonized matter covers the surface of the textile material. Thus, the copolymers having the components within the range set forth in formula (I) have a desireable balance between the above discussed two conditions, namely, the generation of non-combustible gas and carbonization. Accordingly, the resulting fibers have a very superior non-inflammability. The reason for this superiority is not entirely understood, but is believed to be that a molecular structure of the inventive copolymer whose sequence in the carbon chain skeleton is rather different from that of any conventional copolymer of acrylonitrile and vinyl chloride or acrylonitrile and vinylidene chloride, or that of a copolymer of a polycomponent system having the proportion outside of the ranges set forth above in formula (I). Accordingly, the inventive copolymer generates non-combustible gas smoothly and continuously from a low temperature range to a high temperature range. Moreover, the polymer changes to a proper carbonization state.

The amount of acrylonitrile contained in the inventive polymer is preferably within the range of 40 to 65 weight percent. If the content is less than 40 weight percent, it is difficult to produce a synthetic fiber having necessary properties as a textile fiber. If the content is more than 65 weight percent it becomes very difficult to obtain a superior non-inflammability. Furthermore, the amount of antimony and/or stannic acid is preferably within the range of 0.3 to 10 weight percent, and more preferably within the range of 0.5 to 5 weight percent. If the amount is less than 0.3 weight percent, it is difficult to obtain a synthetic fiber having superior non-inflammability. If the amount is more than 10 weight percent, the luster and other physical properties of the resulting synthetic fiber decreases without any additional effect on the non-inflammability. Moreover, it then becomes economically disadvantageous.

Antimony oxide and/or stannic acid used in the present invention may be combined with other non-inflammability agents. Examples of such other agents are, for example, inorganic metallic compounds such as barium borate, zinc borate, tin oxide, etc; aromatic halogen compound such as hexabromobenzene, 2,4,6-tri-bromophenol, etc; aliphatic halogen compounds such as 1,2,3,4-tetra-bromobutane, chlorinated paraffin, etc; halogen containing phosphorus compounds such as tris-(2,3-dibromopropyl)-phosphate, etc; organic phosphorus compounds such as dibutyl aminophosphate, etc; and inorganic phosphorus compounds such as ammonium polyphosphate, etc.

In further features of the invention, there is added 0.2 to 20 weight percent of a polymer or copolymer of glycidyl methacrylate as discussed hereinbefore.

Improving the anti-devitrifying property of copolymer of acrylonitrile and vinyl chloride or a copolymer of acrylonitrile and vinylidene chloride by the addition of glycidyl methacrylate polymer is known by Japanese Patent Publication No. S.48(1973)—29502. The present invention is different from the said Japanese Patent in that first the present invention adds a polymer or copolymer of glycidyl methacrylate to a special mixture already having superior non-inflammability and comprising a copolymer of a polycomponent system consisting of mainly acrylonitirle and mainly of vinyl chloride and vinylidene chloride and for certain purposes an amount of antimony oxide and/or stannic acid as set forth above and second the unexpected effect in stabilization to heat and light produced by the addition as will be discussed hereinbelow. The effect of the addition of glycidyl metahcrylate polymer or copolymer in the present invention produced unexpected results. There is substantial improvement in the anti-devitrifying property and also in the properties of stability to light and heat. Moreover, the combined additions prevent the occurence of erosion and rusting of various machines used in connection with the manufacturing process.

Although it is possible to anticipate the improvement of anti-devitrifying property of a copolymer of acrylonitrile and vinyl chloride or a copolymer of acrylonitrile and vinylidene chloride (whose non-inflammability is better than that of the former) by the addition of a polymer of glycidyl methacrylate, such addition can not be expected, from the disclosure of Japanese Patent Publication S.48 (1973)—29502, to produce improvement in such properties as anti-rusting, and anti-yellowing from thermal exposure, etc. Nevertheless, the addition of the copolymer or copolymer of glycidyl methacrylate to the compound of the present invention has been proven to improve the properties as just discussed, much more and above that which could be anticipated by the teachings in the prior art. This unexpected result can only be achieved by our invention.

It is also known that by the addition of epoxy compounds having epoxy groups such as the reaction product of bis-phenol A and epichlor hydrine, phenyl glycidyl ether, etc, to a synthetic fiber containing halogen containing monomer, the improvement of such properties as light proof, anti-yellowing from thermal exposure, anti-rusting, etc. can be carried out. However, in the case of wet spinning process, the effect of such addition of epoxy compounds is not remarkable since the compounds having the epoxy group are dissolved out from the dope to a spinning bath. Moreover, due to poor compatibility of the epoxy compounds with a copolymer in the dope, the effect leaves much to be desired. Especially, any effect on the improvement of the anti-devitrifying property cannot be seen.

However, in case of the present invention, since the compatibility of the polymer of glycidyl methacrylate with the copolymer used in the present invention is very good, and moreover, the dissolving out of the glycidyl methacrylate polymer or copolymer into the spinning bath does not occur, the effect of addition of such polymer on the improvement of light proof-property, anti-yellowing from thermal exposure property, etc and moreover, also on the improvement of anti-devitrifying property is surprising and substantial.

The polymer or copolymer of glycidyl methacrylate used in the present invention can be prepared either by a mono-component polymerization of glycidyl methacrylate or by a copolymerization of a monomer mixture containing at least 30 weight percent glycidyl methacrylate and at most 70 weight percent of at least one kind of olefinic monomer which can be copolymerized with glycidyl methacrylate. Examples of such copolymerizable olefinic monomers are acrylic acid and its esters, methacrylic acid and its esters, acrylic amides, methacrylic amide, vinyl acetate, acrylonitrile, etc.

The amount of polymer or copolymer of glycidyl methacrylate to be used in the present invention is preferably from 0.2 to 20 weight percent or more preferably 0.3 to 5 weight percent to the amount of the acrylic copolymer consisting essentially of mainly acrylonitrile, vinyl chloride and vinylidene chloride in the proportions set forth as formula (I) above. If the amount of polymer or copolymer of glycidyl methacrylate is less than 0.2 weight percent, no substantial effect can be expected. If the amount is more than 20 weight percent, it is possible to improve the anti-devitrifying property; however, other physical properties desired for textile fabrics, such as those previously mentioned, decrease. Accordingly, it is also not desireable from the economic standpoint.

It is also possible to use other anti-yellowing agents, such as metallic soap, alkyl-tin maleate, alkyl-tin mercaptide, etc, which are very often used as a stabilizer to heat and light.

Also, a small amount of mono-olefinic monomers which can be copolymerized with the polycomponent system of acrylonitrile, vinyl chloride and vinylidene chloride may be used to produce the acrylic copolymer of this invention. Such copolymerizable mono-olefinic monomers may be, for example, acrylic acid and its esters, methacrylic acid and its esters, acrylic amide, methacrylic amide, vinyl acetate, etc. Monomers having dyeable chemical sites may be exemplified by vinyl sulfonic acid, methallyl sulfonic acid, stryene sulfonic acid and various salts of these acids.

The copolymer which is useful for practice of the present invention can be prepared by any conventional polymerization procedure such as emulsion polymerization, suspension polymerization, solution polymerization, etc, in an aqueous medium or in an aqueous medium containing suitable organic solvent. Generally, emulsion polymerization is preferred. Examples of polymerization emulsifiers which may be used in the emulsion polymerization process are higher alcohol sulphate, alkyl sulfonate, etc.

Polymerization catalysts which may be used may be any ordinary initiator for free radical polymerization without any special limitation. Examples of such catalysts are persulphate or a combination of persulphate and sulphrous acid or its salt, azo-compounds such as azo-bis-butylonitrile, etc, peroxides such as benzoyl peroxide, etc.

The polymerization temperature is preferably within the range of 30° to 65° C.

Furthermore, to produce synthetic fibers from the compound of the invention, either ordinary wet spinning or dry spinning process may be employed. Any well known solvent which can dissolve acrylic copolymer can be used in the preparation of the spinning dope. Examples of solvents are dimethyl sulfoxide, dimethyl formamide, dimethyl acetamide, acetone, acetonitrile, etc.

A coagulating bath may be used with a coagulating bath temperature preferably between 5° to 40° C.

The non-inflammability of the fiber can be evaluated using the following technique. Generally, the evaluation of non-inflammability of fibers is carried out using a fabric prepared from the fiber to be evaluated. However, this conventional technique of evaluation often produces discrepancies in the evaluation of the non-inflammability of the fiber itself since the non-inflammability of the fabric depends upon the non-inflammability of the fiber itself, and in addition, other facts such as thickness, density, uniformity, etc of the fabric, and also number of twists, count, etc of the yarn used to produce the fabric.

In order to avoid such discrepancy and non-correlative results, and to obtain better evaluation of the fiber's non-inflammability properties, the evaluation used here was carried out by using samples of rope-type prepared from filaments by twisting, by the limited oxygen method and by the rope testing method.

The main point of the limited oxygen index method is the observation of the concentration of oxygen mixed with nitrogen which is necessary to continue burning. A sample is placed in an atmosphere consisting essentially of oxygen and nitrogen. The concentrations and proportions can be readily changed continuously.

Each sample used in the limited oxygen index was prepared in the following way. First, six multifilaments, each having 300 single filaments wherein each single filament was 3 deniers, were twisted for 75 turns per 25 inches and then two of such twisted filaments were combined together to form a rope. Each sample of the rope type was set perpendicularly in a holder used in the oxygen index tester, so as to have its length at 70% of contraction. The observation was to determine the oxygen concentration in percents, necessary to continue burning for 5 cm of length of each sample. The higher the number of limited oxygen index, the better non-inflammability of the fiber tested.

Each sample used in the rope test was prepared as follows. First, six multifilaments (each having 300 single filaments each single filament being of 3 deniers) were twisted together with four cotton threads (count number 30, 6 cords) for 75 turns per 25 inches and then by plying two of such twisted filaments into a rope. The cotton threads was used in each sample rope to prevent the dropp-off of the sample by the fusion of acrylic filaments during burning. Five test samples were prepared for each acrylic multifilament to be tested. They were dried at 105° C for 1 hour before applying a combustion test.

The combustion test was carried out as follows. Using a microburner for the combustion test, a flame is contacted with a sample rope hanging down freely for 12 seconds. This is repeated four times and observing each period of duration of burning per each contact. The longest duration among the four observed periods is taken as the period of duration of burning of the sample rope. Such a test as mentioned above was carried out repeatedly for 5 times for each kind of acrylic synthetic fiber to be tested. From these observation data, the non-inflammability is classified into 9 grades as shown in Table 1, wherein A-1 is the highest and B-5 is the lowest, showing the fact that five sample ropes burn off completely.

Table 1

| Non-inflammability | Burning Condition |
| --- | --- |
| | Mean period of duration on 5 samples. No |

Table 1-continued

| Non-inflammability | Burning Condition |
| --- | --- |
| | sample completely burns off |
| A-1 | Less than 5 seconds |
| A-2 | Greater than 5 second; less than 10 seconds |
| A-3 | greater than 10 seconds, less than 20 sec. |
| A-4 | Greater than 20 seconds. |
| | Number of samples completely burns off among five samples |
| B-1 | 1 |
| B-2 | 2 |
| B-3 | 3 |
| B-4 | 4 |
| B-5 | 5 |

In the present invention, the non-inflammability of the acrylic fiber was evaluated by the above mentioned two methods, namely, the limited oxygen index method and the rope testing method. It can be pointed out that it is difficult to obtain a fabric having superior non-inflammability from an acrylic synthetic fiber having inferior results of either or both of the two test methods. Moreover, it is certain that a fabric prepared from an acrylic fiber having superior results of the above two test methods is superior in non-inflammability properties. There is a reliable correlation between the observed results on the fiber and the non-inflammability of a fabric made from such fiber. This was not necessarily so with use of previous test methods.

Furthermore, the anti-yellowing property from thermal exposure was evaluated by observing the degree of reflection of visible rays from the surface of the fiber (which is thermally treated at 145° C for five minutes in a dry state) using a differential colorimeter. The light proof property was determined by observing a color change of a sample after irradiated for 80 hours using a fade meter. The devitrifying property was determined by observing devitrifying status of a sample after boiling it in water for 3 hours. The anti-rusting property was evaluated using a sample which was dried for 16 hours at 110° C and again treated with a saturated water vapour at 40° C for 24 hours. The above results were observed and noted qualitatively, in the following tables.

The present invention will now be further illustrated with actual examples, which examples are not to be construed in any limiting sense. The parts and percents herein are in terms of weight unless otherwise noted.

EXAMPLES 1–2; COMPARATIVE EXAMPLES 1–4

In each example, emulsion polymerization was carried out using a pressure proof polymerization vessel of 15 liter inside capacity. The polymerization conditions were as follows. To 100 parts of a mixture of monomers, 700 parts of water were used. A polymerization initiator comprising a combination of ammonium persulphate and sodium hydrogen sulphite was used. An emulsifier for emulsion polymerization comprising sodium alkylbenzene sulfonate was used. The temperature of polymerization was 43° C. The polymerization time was 5 hours. In Table 2, there are listed 6 specimen of acrylic copolymers obtained by emulsion polymerization using the above conditions and having the specified components.

TABLE 2

| No. | Composition of copolymer Weight percent | | | | A + B + 1.29C | Content of Chlorine (Cl %) |
|---|---|---|---|---|---|---|
| | AN | VCl | VdCl$_2$ | NaMAS | | |
| Ex. 1 | 58.0 | 28.5 | 13.1 | 0.4 | 103.4 | 25.8 |
| Ex. 2 | 58.2 | 20.3 | 21.0 | 0.5 | 105.6 | 26.9 |
| Comp. Ex. 1 | 57.8 | 36.3 | 5.4 | 0.5 | 101.1 | 24.6 |
| Comp. Ex. 2 | 57.6 | 0 | 42.1 | 0.3 | 111.9 | 30.8 |
| Comp. Ex. 3 | 58.1 | 41.3 | 0 | 0.6 | 99.4 | 23.5 |
| Comp. Ex. 4 | 58.5 | 10.9 | 30.2 | 0.4 | 108.4 | 28.3 |

Note:
AN = acrylonitrile
VCl = Vinyl Chloride
VdCl$_2$ = Vinylidene chloride
NaMAS = sodium methallyl sulfonate.

A spinning dope was prepared by dissolving each copolymer shown in Table 2 into dimethyl formamide as a solvent and adding 3 weight percent of stannic acid and 3 weight percent of a straight polymer of glycidyl methacrylate. Then wet spinning was carried out in each example, extruding the dope through a nozzle into a coagulating bath consisting essentially of 60% aqueous solution of dimethyl formamide to coagulate.

The coagulated filament was continuously washed with water, dried, stretched and finally thermally treated.

The non-inflammability, anti-devitrifying, light-proof, anti-rusting and anti-yellowing from thermal exposure properties were tested for on the obtained fibers and the results thereof are shown in Table 3.

sumably because of their glycidyl methacrylate component) the anti-devitrifying properties of each fiber was superior as shown in Table 3, those fibers of Comparative Examples 2 and 4 are inferior in other properties, such as light proof, anti-rusting and anti-yellowing. It is clearly that only those fibers having components satisfying the requirements of this invention are superior in all the properties of non-inflammability, anti-devitrifying, light proof, anti-rusting and anti-yellowing.

Examples 3, 4 and 5

Spinning dope was prepared by dissolving an acrylic copolymer consisting essentially of 60.4 weight percent acrylonitrile, 25.0 weight percent vinyl chloride, 14.1 weight percent vinylidene chloride (A + B + 1.29C =

TABLE 3

| No. | A + B +1.29C | X-Method (1) | Y-Method (2) | Non-inflammability | Anti-devitrifying property | Light-proof property | Anti-rusting property | Anti-yellowing property |
|---|---|---|---|---|---|---|---|---|
| Ex. 1 | 103.4 | 34 | A-1 | Superior | O | O | O | O |
| Ex. 2 | 105.6 | 35 | A-2 | Superior | O | O | O | O |
| Comp. Ex. 1 | 101.1 | 31 | B-1 | Not Superior | O | O | O | O |
| Comp. Ex. 2 | 111.9 | 32 | B-5 | Not Superior | O | Δ | X | Δ |
| Comp. Ex. 3 | 99.4 | 29 | B-1 | Not Superior | O | O | O | O |
| Comp. Ex. 4 | 108.4 | 34 | B-2 | Not Superior | O | Δ | Δ | Δ |

Notes:
(1) Limited oxygen index method
(2) rope testing method
O = superior
x = not as superior
Δ = inferior It is apparent from Table 3 that the non-inflammability of fibers obtained from compartive examples 1 to 4 are rather inferior. In these comparative examples the components of the fibers do not satisfy the requirements of the present invention. In comparative examples 2 and 4, inspite of their high chlorine content (see Table 2), no remarkable improvement of non-inflammability was achieved. On the other hand, although (pre- 104.1) and 0.5 weight percent sodium styrene sulfonate (hereafter this compound may sometimes be called SSS) into dimethyl formamide, and further adding antimony oxide and/or a straight polymer of glycidyl methacrylate in each example. The wet spinning process was carried out as in Example 1. The obtained results are summarized in Table 4. The components of each copolymer are also shown in Table 4. The notations are the same as in Table 2, and 3.

TABLE 4

| No. | Composition of Resin (Wt.%) | | | | Antimony Oxide (wt.%) | Polyglycidyl methacrylate (wt %) |
|---|---|---|---|---|---|---|
| | AN | VCl | VdCl$_2$ | SSS | | |
| Ex. 3 | 60.4 | 25.0 | 14.1 | 0.5 | 7 | 2.5 |
| Ex. 4 | 60.4 | 25.0 | 14.1 | 0.5 | 0 | 2.5 |
| Ex. 5 | 60.4 | 25.0 | 14.1 | 0.5 | 7 | 0 |

TABLE 4-continued

|  | X-Method | Y-Method | Non-inflammability | Anti-devitri-fying property | Light-proof property | Anti-rusting Property | Anti-Yellowing property |
| --- | --- | --- | --- | --- | --- | --- | --- |
| Ex. 3 | 36 | A-1 | Superior | O | O | O | O |
| Ex. 4 | 29 | B-2 | Slightly less superior | O | O | O | O |
| Ex. 5 | 36 | A-1 | Superior | Δ | X | X | Δ |

From Table 4 it is apparent that since those prepared in Example 4 and Example 5 satisfy the conditions specified in the present invention, they are superior in a variety of combined properties, such as non-inflammability, anti-devitrifying, light proof, anti-rusting and anti-yellowing. However, the fiber of Example 3 which satisfies all of the conditions specified in so far as percents and components of A, B and C, and including antimony oxide and/or stannic acid and/or polymer or copolymer of glycidyl methacrylate are concerned, makes it possible to prepare a fiber which produces all of the combined advantageous properties, as seen in Example 3. The other Examples 4 and 5 show that despite the absence of one or the other class of additives, superior results are attained. Of course Example 3 shows much greater superiority in properties.

Example 6; Comparative Examples 5, 6

In each example, polymerization was carried out as in Example 1. A dope was prepared by dissolving the obtained copolymer in dimethyl formamide and further adding 1.5 weight percent of stannic acid and 10 weight percent of a copolymer consisting essentially of 60 weight percent of glycidyl methacrylate and 40 weight percent of methyl acrylate. Then a wet spinning process was carried out as in Example 1. The obtained results are shown in Table 5. The notations are the same as in Tables 2 and 3.

From Table 5, it is apparent that since those resins in comparative examples 5 and 6 do not satisfy all of the conditions of components and proportions, specified in the present invention, the fibers prepared by the comparative example methods are inferior in non-inflammability. Furthermore, the fiber prepared in comparative example 6 is also inferior in other properties such as light-proof, anti-rusting, anti-yellowing, etc, regardless of whether it contained a sufficient amount of glycidyl methacrylate.

On the otherhand, from the results obtained in Example 6, it is apparent that an acrylic synthetic fiber having both superior non-inflammability and a combination of other superior properties, such as anti-devitrifying, light-proof, anti-rusting, and anti-yellowing, can be prepared from only a fiber whose composition is within the ranges set forth above.

TABLE 5

| NO. | Composition of resin (wt %) | | | | Content of chlorine (wt %) | A+B+1.29C |
| --- | --- | --- | --- | --- | --- | --- |
|  | AN | VCl | VdCl$_2$ | SPMA* | | |
| Ex. 6 | 46.2 | 38.1 | 15.3 | 0.4 | 32.8 | 104.0 |
| Comp.Ex 5 | 46.0 | 46.2 | 7.2 | 0.4 | 31.7 | 101.7 |
| Comp Ex 6 | 45.8 | 21.3 | 32.6 | 0.3 | 36.0 | 109.2 |

|  | X-Method | Y-Method | Non-Inflammability | Anti-devitri-fying property | Light-proof property | Anti-rusting property | Anti-Yellowing Property |
| --- | --- | --- | --- | --- | --- | --- | --- |
| Ex. 6 | 37 | A-1 | Superior | O | O | O | O |
| Comp Ex 5 | 34 | B-1 | Not Superior | O | O | O | O |
| Comp Ex 6 | 36 | B-2 | Not Superior | O | Δ | Δ | Δ |

Note:
*SPMA = sodium salt of sulfopropyl methacrylate

Examples 7–9; Examples 10–13

An emulsion polymerization was carried out using a pressure-proof polymerization vessel of 15 liter inner capacity, in each example.

The polymerization conditions were as follows. To 100 parts of a mixture of monomers (mixture of 21 parts of acrylonitrile, 8 parts vinylidene chloride, 68 parts vinyl chloride and 3 parts sodium methallyl sulfonate), 600 parts of water were used. As the polymerization initiator, a combination of 0.05 parts of ammonium persulfate, 1 parts of acid sodium sulfite and 0.0012 parts of ferrous ion was used. As the emulsifier for emulsion polymerization, sodium dodecyl sulfate was used. The temperature of polymerization was 40° and the polymerization time was 5 hours. Meanwhile, during the polymerization, a mixture of monomers (mixture of 47 parts of acrylonitrile and 17 parts vinylidene chloride) and 0.2 parts of ammonium persulphate was added continuously. The obtained copolymer consisted essentially of 54.4 weight percent acrylonitrile, 27.0 weight percent vinyl chloride, 18.2 weight percent vinylidene chloride and 0.4 weight percent sodium methallyl sulfonate. The parameter (A+B+1.29C) was about 104.878.

A series of acrylic synthetic fibers were prepared by wet spinning from 7 mixtures comprising the copolymer obtained above, together with other additives, such as antimony oxide, stannic acid and polyglycidyl methacrylate, as shown listed in Table 6. The results of test carried out thereon are shown in Table 6, and 7. The notations are the same as in Tables 2 and 3.

From Table 7, it is apparent that those fibers obtained in examples 10–13 are inferior to those obtained in examples 7–9, in such properties as non-inflammability, anti-devitrifying, light-proof, anti-rusting and anti-yellowing.

TABLE 6

| No. | Composition of Resin (wt. %) | | | | Additives (wt.% to resin) | | |
|---|---|---|---|---|---|---|---|
| | AN | VCl | VdCl$_2$ | NaMAS (1) | Antimony oxide | Stannic Acid | Polyglycidy methacrylate |
| Ex. 7 | 54.4 | 27.0 | 18.2 | 0.4 | 5 | — | 4 |
| Ex. 8 | 54.4 | 27.0 | 18.2 | 0.4 | — | 5 | 4 |
| Ex. 9 | 54.4 | 27.0 | 18.2 | 0.4 | 3 | 2 | 4 |
| Ex. 10 | 54.4 | 27.0 | 18.2 | 0.4 | 5 (2) | — | 4 |
| Ex. 11 | 54.4 | 27.0 | 18.2 | 0.4 | — | 5 (3) | 4 |
| Ex. 12 | 54.4 | 27.0 | 18.2 | 0.4 | 5 | — | 5 (4) |
| Ex. 13 | 54.4 | 27.0 | 18.2 | 0.4 | 5 | — | 5 (5) |

Notes:
(1) NaMAS = sodium methallyl sulfonate
(2) Aluminum hydroxide was used in place of antimony oxide.
(3) Zirconium oxide was used in place of stannic acid
(4) Epon 1001 (commercial name used by Shell Petroleum Oil Corp.) was used in place of polyglycidyl methacrylate.
(5) Epon 812 (produced by Shell Petroleum Oil Corp) was used in place of polyglycidyl methacrylate.

TABLE 7

| No. | X-Method | Y-Method | Non-Inflammability | Anti-devitrifying property | Light-proof property | Anti-rusting property | Anti-yellowing property |
|---|---|---|---|---|---|---|---|
| Ex. 7 | 34 | A-2 | Superior | O | O | O | O |
| Ex. 8 | 36 | A-1 | Superior | O | O | O | O |
| Ex. 9 | 35 | A-1 | Superior | O | O | O | O |
| Ex 10 | 32 | B-2 | Not Superior | O | O | O | O |
| Ex. 11 | 35 | B-5 | Not Superior | O | O | O | O |
| Ex. 12 | 34 | A-2 | Superior | X | X | X | Δ |
| Ex. 13 | 34 | A-2 | Superior | X | X | X | Δ |

Example 14; Comparative Examples 7, 8

It is generally believed in the art that the effect of halogen atom on the improvement of non-inflammability becomes more remarkable with increase of the amount of halogen atoms contained in the molecular structure of the fiber. The effect of bromine atom is larger than that of chlorine atom to about 2–3 times. Therefore, a study was undertaken to compare the non-inflammability of an acrylic fiber which satisfied the conditions of the present invention with that of other acrylic fibers which did not satisfy the conditions of the present invention, but contained the same amount of acrylonitrile. Two comparative examples are listed in Table 8 wherein one copolymer is a three component system consisting essentially of acrylonitrile, vinyl chloride and vinyl bromide and the other is a copolymer consisting essentially of acrylonitrile and vinylidene chloride. These fibers shown in Table 8 were prepared from copolymers, each having added thereto 2.5 weight percent of antimony oxide. The conditions were as set forth in Example 1. The notations are the same as in Tables 2 and 3.

TABLE 8

| No. | Composition of Resin (wt %) | Amount* of halogen converted to chlorine (wt %) | X-method | Y-method | Non-inflammability |
|---|---|---|---|---|---|
| Ex. 14 | AN=58; VCl=27 VdCl$_2$=15 | 26.1 | 33 | A-1 | Superior |
| Comp. Ex. 7 | AN=58; VCl=35 VBr=7 | 30.3–35.5 | 29 | A-3 | Not superior |
| Comp. Ex. 8 | AN=58; VdCl$_2$=42 | 30.7 | 33 | B-5 | Not Superior |

Note:
*Amount of chlorine weight percent + amount of bromine weight percent × (2 to 5)

From Table 8, it is apparent that only the fibers which satisfy the conditions of the present inventions have superior non-inflammability.

The foregoing description is for purposes of illustrating the principles of the invention. Numerous variations and modifications thereof would be apparent to the worker skilled in the art. All such modifications and variations are to be considered to be within the spirit and scope of the invention.

What is claimed is:
1. An acrylic synthetic fiber comprising an acrylic copolymer consisting essentially of a mixture of olefinic monomers (A) excluding monomers having dyeable sites in their molecular structure and mainly comprising acrylonitrile, said acrylonitrile being in an amount of from 40 to 65 weight percent of said copolymer, vinyl chloride and vinylidene chloride in amounts within the range defined by the following

$$102.8 < A + B + 1.29C < 107.4$$

wherein A is in weight percents, B is the weight percent of vinyl chloride and C is the weight percent of vinylidene chloride, and 0.3 to 10 weight percent of antimony oxide and/or stannic acid.

2. The fiber of claim 1, wherein said antimony oxide and/or stannic acid is in an amount of 0.5 to 5 weight percent.

3. The fiber of claim 1 wherein said fiber further comprises 0.2 to 20 weight percent homopolymer of glycidyl methacrylate and/or its copolymer.

4. The fiber of claim 3, wherein said homopolymer or copolymer of glycidyl methacrylate is in an amount of from 0.3 to 5 weight percent.

5. The fiber of claim 1, wherein said antimony oxide and or stannic acid is combined with another non-inflammablizing agent selected from the group consisting of barium borate, zinc borate, tin oxide, hexabromobenzene, 2,4,6-tri-bromophenol, 1,2,3,4-tetrabromobutane, chlorinated paraffin, tris-(2,3-dibromopropyl)-phosphate.

6. An acrylic synthetic fiber comprising an acrylic copolymer consisting essentially of a mixture of olefinic monomers (A) excluding monomers having dyeable sites in their molecular structure and mainly comprising acrylonitrile, said acrylonitrile being in an amount of from 40 to 65 weight percent of said copolymer, vinyl chloride and vinylidene chloride in amounts within the range defined by the following $$102.8 < A + B + 1.29C < 107.4$$

wherein A is in weight percents, B is the weight percent of vinyl chloride and C is the weight percent of vinylidene chloride, and 0.2 to 20 weight percent of homopolymer or copolymer of glycidyl methacrylate.

7. The fiber of claim 6, wherein said copolymer of glycidyl methacrylate is prepared from a monomer mixture of at least 30 weight percent glycidyl methacrylate and at most 70 weight percent one or more olefinic monomer copolymerizable with said glycidyl methacrylate, said copolymerizable monomer being selected from the group consisting of acrylic acid and its esters, methacrylic acid and its esters, acrylic amide, methacrylic amide, vinyl acetate and acrylonitrile.

* * * * *